US008928652B2

(12) United States Patent
McDaniel

(10) Patent No.: US 8,928,652 B2
(45) Date of Patent: Jan. 6, 2015

(54) SKETCHED OVERDRAWN LINES FOR EDITING SPLINE-BASED THREE-DIMENSIONAL CURVES

(75) Inventor: Richard Gary McDaniel, Hightstown, NJ (US)

(73) Assignee: Siemens Aktiengesellschaft, Munich (DE)

( * ) Notice: Subject to any disclaimer, the term of this patent is extended or adjusted under 35 U.S.C. 154(b) by 318 days.

(21) Appl. No.: 13/105,058

(22) Filed: May 11, 2011

(65) Prior Publication Data

US 2011/0279455 A1　Nov. 17, 2011

Related U.S. Application Data

(60) Provisional application No. 61/333,297, filed on May 11, 2010.

(51) Int. Cl.
G06T 15/20　(2011.01)
G06T 15/00　(2011.01)
G06T 19/20　(2011.01)

(52) U.S. Cl.
CPC ......... *G06T 19/20* (2013.01); *G06T 2219/2021* (2013.01)
USPC ................ 345/419; 703/1; 345/441; 345/423

(58) Field of Classification Search
None
See application file for complete search history.

(56) References Cited

U.S. PATENT DOCUMENTS

2006/0045343 A1* 3/2006 Tremblay et al. ............. 382/186
2009/0310868 A1* 12/2009 Oota ............................. 382/199

FOREIGN PATENT DOCUMENTS

WO　WO2007146069 A2 * 12/2007 .............. G06F 19/00

OTHER PUBLICATIONS

Kara, et al "Construction and Modification of 3D Geometry Using Sketch-based Interface", Eurographics Workshop on Sketch Based Interfaces and Modeling, Thomas Stahovich and Mario Costa Sousa (Eds.), 2006.*
Fleisch, et al "Constraint Stroke-Based Oversketching for 3D Curves", Eurographics Workshop on Sketch-Based Interfaces and Modeling, John F. Hughes and Joaquim A. Jorge (Guest Eds.), 2004.*
Shi, et al "Performance Evaluation of Line Simplification Algorithms for Vector Generalization", The Cartographic Journal, 43(1), pp. 27-44, Mar. 2006.*
Zhou, et al "Shape-Aware Line Generalization With Weighted Effective Area", Developments in Spatial Handling, 11th Intl Symposium on Spatial Data Handling, pp. 369-380, Springer Berlin Heidelberg.*

* cited by examiner

*Primary Examiner* — Ulka Chauhan
*Assistant Examiner* — Patrick F Valdez

(57) ABSTRACT

An overdraw method for editing a three-dimensional geometry includes receiving a three-dimensional geometry including a plurality of individual curves whose positions are defined by a plurality of control points, receiving a polyline overdrawn on the three-dimensional geometry, matching the polyline to the three-dimensional geometry to determine a portion of the three-dimensional geometry being modified, recognizing a shape feature of the polyline to determine a shape modification to apply to the three-dimensional geometry, shifting the three-dimensional geometry to determine a modified geometry by changing a position of at least one of the control points towards the polyline, and matching the modified geometry with at least one symmetry operator to determine whether the changed position satisfies a constraint and applying the constraint to the modified geometry to further modify the modified geometry.

16 Claims, 3 Drawing Sheets

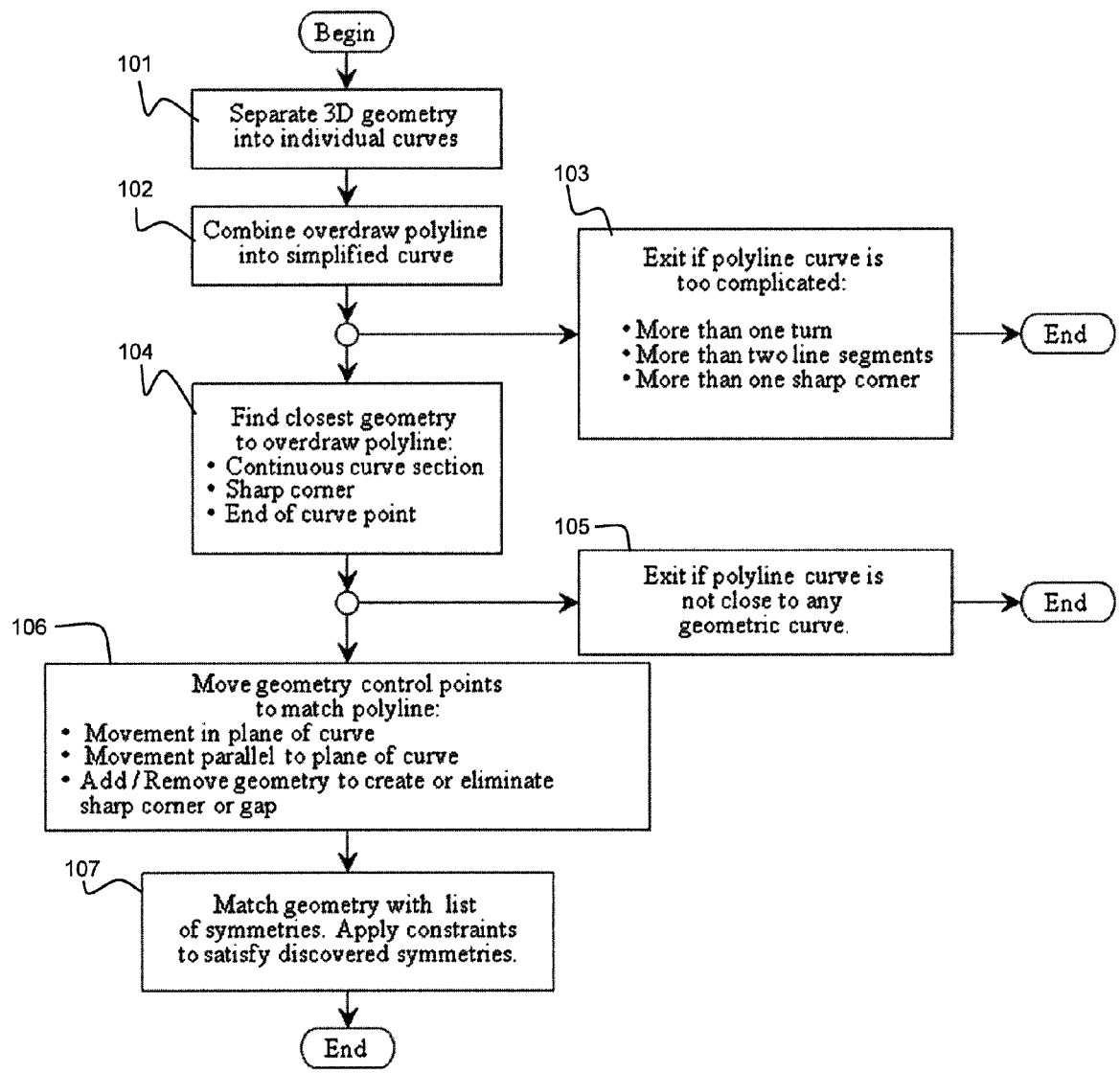

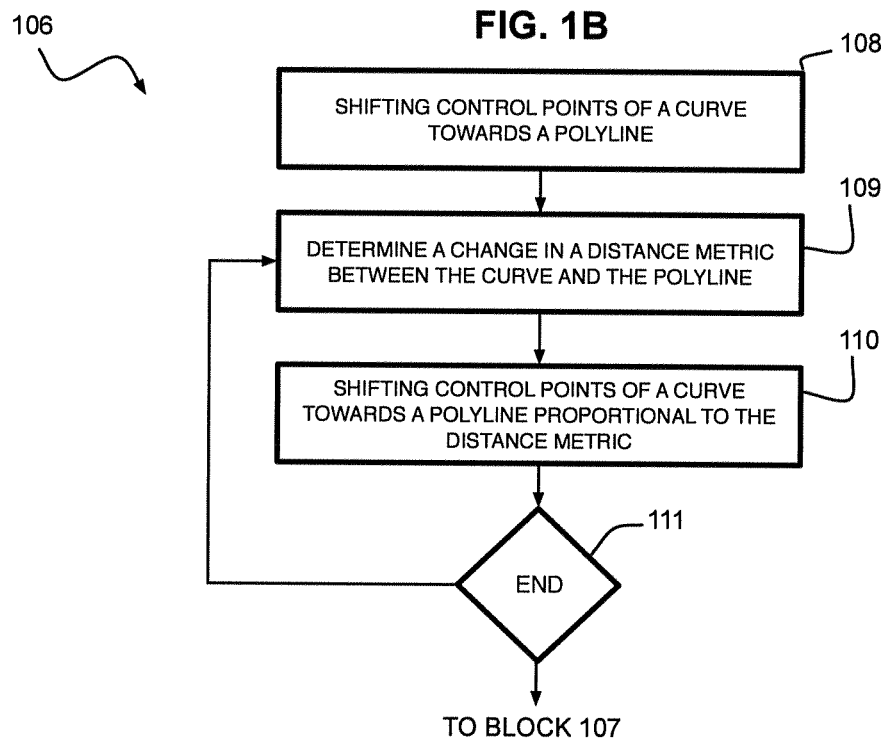
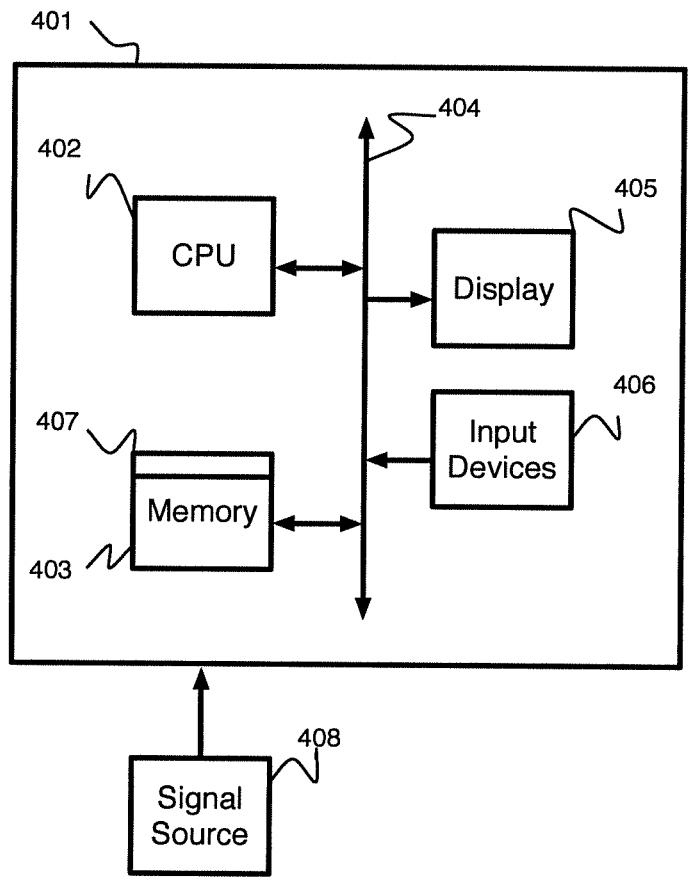

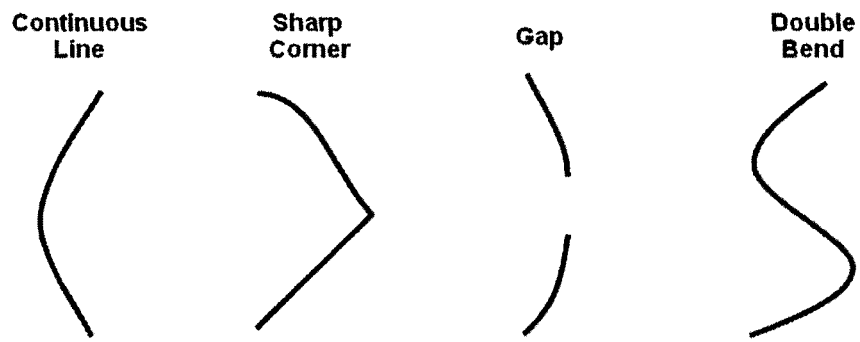
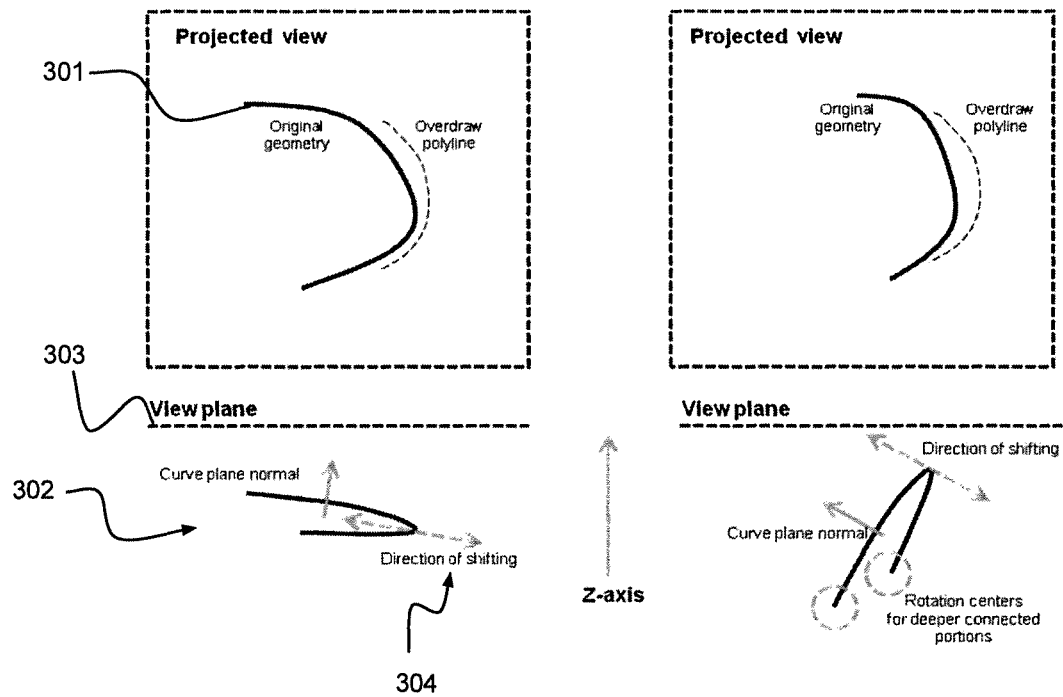

SKETCHED OVERDRAWN LINES FOR EDITING SPLINE-BASED THREE-DIMENSIONAL CURVES

CROSS-REFERENCE TO RELATED APPLICATION

This is a non-provisional application claiming the benefit of U.S. provisional application Ser. No. 61/333,297, filed May 11, 2010, the contents of which are incorporated by reference herein in their entirety.

BACKGROUND

1. Technical Field

The present disclosure relates to image editing, and more particularly to an overdraw method for editing a three-dimensional geometry.

2. Discussion of Related Art

There is a general need for tools for drawing three dimensional objects such as the ones used by CAD drawing, product design, animation in movies, and video games.

BRIEF SUMMARY

According to an embodiment of the present disclosure, an overdraw method for editing a three-dimensional geometry includes receiving a three-dimensional geometry comprising a plurality of individual curves whose positions are defined by a plurality of control points, receiving a polyline overdrawn on the three-dimensional geometry, matching the polyline to the three-dimensional geometry to determine a portion of the three-dimensional geometry being modified, recognizing a shape feature of the polyline to determine a shape modification to apply to the three-dimensional geometry, shifting the three-dimensional geometry to determine a modified geometry by changing a position of at least one of the control points towards the polyline, and matching the modified geometry with at least one symmetry operator to determine whether the changed position satisfies a constraint and applying the constraint to the modified geometry to further modify the modified geometry.

According to an embodiment of the present disclosure, an overdraw method for editing a three-dimensional geometry includes receiving a three-dimensional geometry comprising a plurality of individual curves whose positions are defined by a plurality of control points, receiving a polyline overdrawn on the three-dimensional geometry, modifying, iteratively, the three-dimensional geometry by shifting the three-dimensional geometry to determine a modified geometry approaching a shape feature of the polyline, matching the modified geometry to a constraint, and applying the constraint to the modified geometry.

BRIEF DESCRIPTION OF THE DRAWINGS

Preferred embodiments of the present disclosure will be described below in more detail, with reference to the accompanying drawings:

FIGS. 1A-B are a flow diagram of a method for modifying three-dimensional geometry using overdraw according to an embodiment of the present disclosure;

FIGS. 2A-D show exemplary recognized polyline shapes according to an embodiment of the present disclosure;

FIG. 3 the local plane of curvature of the geometry is used to determine shift direction according to an embodiment of the present disclosure; and FIG. 4 is a system for executing an overdraw method according to an embodiment of the present disclosure.

DETAILED DESCRIPTION OF PREFERRED EMBODIMENTS

According to an embodiment of the present disclosure, overdraw is a technique for editing lines and curves. Throughout this disclosure, the terms "line" and "curve" may be used interchangeably unless otherwise noted. An overdraw method includes drawing lines and curves over an entity being modified, wherein the entity is embodied as three-dimensional lines and curves projected onto a two-dimensional viewing surface using a view transform. The lines and curves of the entity may be represented using a spline method such as cubic Bezier splines. Control points of the splines are directly used and modified, taking into account a viewing angle of a scene and different kinds of transformations that modify a curve. That is, the control points control a position of a polyline.

There are many methods for representing lines and surfaces in a geometric modeling tool. One method is to use polynomial curves such as splines. Splines transform a small set of points in space or control points into a continuous curve or surface. The Bezier spline uses a number of control points equal to one plus the degree of the spline polynomial. A cubic Bezier spline uses four control points, one on each end point of the curve and two to control the direction and slope of how the curve proceeds from one end to the other. Other kinds of polynomial geometric methods may be used, but the cubic Bezier spline is used for purposes of this disclosure without loss of generality.

To form longer geometric curves, multiple Bezier curves may be joined end to end. One of the end control points of one spline is made identically equal to one of the end control points of a second spline. The adjacent control points of the splines may be made to be co-linear with the shared end point in order to make the two splines continuous. Maintaining geometric features of continuity and positions where the curves are not continuous is important when these curves are manipulated.

It is possible to manipulate the shape and position of a spline by changing the position of its control points. Control points may be directly edited by a user. Control points may be indirectly edited by managing a computation that determines how well the curve conforms to a set of given criteria. By shifting the control points in different directions, one can find the direction of movement that maximizes the improvement of the curve's conformance. This method may be repeated until the curve reaches a point of maximal conformance.

Incremental control point shifting can achieve certain kinds of curve manipulation. It is possible to improve an approximation of the slope of a continuous curve. The incremental method does not add or remove individual control points or spline portions from the curve. Heuristic methods may be applied to add or remove individual control points or spline portions from the curve.

According to an embodiment of the present disclosure, three-dimensional geometric curves may be edited using hand drawn lines (input lines) that mimic the improvement that a user intends to perform. The input lines may be drawn over the top of the existing two-dimensional rendered transform of the three-dimensional geometric curves as displayed to the user.

According to an embodiment of the present disclosure, a set of three-dimensional curve geometry represented as cubic Bezier splines and a set of overdraw polylines representing the edits to make to the three-dimensional geometry are taken as input. It may be assumed that the overdraw polylines and the three-dimensional Bezier curves are related in that the user actually intends that the three-dimensional geometry will be improved if the position of the overdraw polylines are taken into consideration. As such, it may be assumed that the polylines will match up to the two-dimensional projection of the geometric curves at some portion of the geometry. The polylines will be geometrically close in proximity on the two-dimensional projection to the portion of the three-dimensional geometric line that it matches. Also, the polylines will contain only a small degree of geometric complexity; that is, that the number of corners in the polylines is one or less and that there are few (e.g., one or two) continuous portions of polyline represented. Overdraw polylines that are complicated will be unlikely to match any of the heuristic improvements outlined in the description and may be rejected.

Given the three-dimensional geometry and the two-dimensional overdraw polylines; the three-dimensional geometry may be arranged to be more like the two-dimensional overdraw polylines with respect to the projected view of the three-dimensional geometry as presented to the user. The polylines are treated as a cue for editing operations to be performed on the three-dimensional geometry that may make some of the points in the three-dimensional geometry come closer to matching the shape of the polylines. The shape of the polylines is used as a cue to describe how the three-dimensional geometry should be modified.

An exemplary method is embodied in the flow chart of FIG. 1A. Here, the three-dimensional geometry is managed so that the individual curves are known from one another 101. This may be performed ahead of time as part of the modeling process. The user's polyline drawing is analyzed to determine its shape 102. Here, the user's polyline drawing may be combined into a shape. Complicated shapes may be rejected 103. The polyline is matched to the three-dimensional geometry to determine what geometry is being modified 104. Polylines that are not near to a three-dimensional curve are rejected 105. The three-dimensional geometry is shifted by changing the position of its control points so that the points of the curve more closely match the polyline 106. If needed, new geometry is created and unused geometry is deleted. The modified geometry is matched with a set of symmetry operators that are applied to see if the changed position is close to a kind of simplifying constraint 107. If so, the constraints are applied to the geometry by determining the proper control point positions.

The three-dimensional geometry may be represented as a set of cubic Bezier splines. At block 101, the splines may be categorized into sets of continuous lines that later can be matched with the overdraw polyline. Geometry that is not visible is removed from consideration. Geometry can be unseen because the view is rotated such that the geometry is behind or off to the side of the current projection. It might also be unseen because it is occluded by other geometric objects in the view. The user may select occluded objects so that they will not be removed from consideration and can be modified by overdraw. The user may also cause occluding objects to become hidden or transparent in order to edit normally occluded geometry.

The overdraw method operates on curves. Curves in a three-dimensional model can include explicitly modeled curves and/or derived curves. Derived curves include the edges of a surface and intersections of a surface or solid with another surface or solid.

The visible three-dimensional geometry is separated into continuous sections of curves that end either with a point or a sharp corner. Intersections between curves that blend smoothly into one another are categorized as a shared continuous section and the portions that blend smoothly and those that form a sharp corner are noted.

Curves whose curvature reverses direction to produce opposite bends may be noted. A curve that reverses direction may indicate a planar shape or a helical curve. Curvature is tracked by following each curve starting from one end and tracking the direction of the curve as it bends. The Bezier splines indicate when an abrupt change in curvature occurs when the planes formed by each of the two intermediate control points with the two end control points have a wide angle between them. Each section of continuous curve is labeled noting the region where it curves in a single direction. This region may be approximately planar and the direction of the plane is noted.

For straight lines, there may be no immediate plane derived from the curvature; however, the method may determine a plane when the straight line is connected to another curve by a sharp corner. The plane is determined to be the shared plane of the line and curve at the sharp corner. Where there are multiple curves meeting at a sharp corner, the plane is determined to be the one that is most parallel to the viewing plane. If a straight line has no connected curves, the method uses the viewing plane as the assigned plane for that portion of the three-dimensional geometry.

At block 102, the method uses the shape of the overdraw polyline to determine how to modify the existing three-dimensional geometry. To determine the shape of the polyline, the polyline is reduced from a large set of points and line segments to a small set of short polynomial-described curves. The polyline curves and the three-dimensional geometry that is being edited can both be represented using splines. Even though the shape of the polyline is represented as a spline, this document will continue to call it a polyline to differentiate it from the splines that represent the geometric model. Note that the polyline splines are two-dimensional and are represented as a drawing on the viewing plane. The polyline splines are not meant to be brought into the three dimensional space of the geometric model.

Several methods exist for converting a polyline into a polynomial. One method is to merge the segments of the polyline into a single polygonal shape and then smooth the shape by removing the shortest line segments. The centroid of the polygon is then used to form a new, simplified line where multiple strokes are eliminated. The simplified line can then be replaced by a polynomial line by performing spline fitting.

The polyline shape is analyzed to determine its complexity. Shapes that are too complicated are rejected and are not used to modify the three-dimensional geometry. This ability to reject polylines is an important distinction from the current methods used by other applications. Other applications will use the polyline data to modify the geometry whether it makes sense or not. As a result, misplaced lines, scribbles, and other inadvertent polyline mistakes become applied to the geometry and are very likely to ruin it. Badly managed polylines can cause the geometry to form loops and curls as well as cause large movements that are difficult to remove. By rejecting polyline edits that are too complicated to parse, mistakes are less likely to be applied to the geometry.

The method determines the complexity of the polyline shape by counting the number of individual spline entities and noting the occurrence of sharp corners. A polyline shape is allowed to have a distinguishing feature. A feature is defined as a departure from a typical straight or slightly curved, continuous line. Features the method will recognize include a sharp corner, a gap, and a double bend. Examples of these shapes are shown in FIG. 2A-D. A sharp corner includes two splines meeting at their end points where the slope changes abruptly (FIG. 2B). A gap includes a pair of splines that are not connected but the gap between them is straight and continuous with the path the splines take (FIG. 2C). A double bend is a spline or pair of splines that are continuous without a corner but the direction of curvature changes once (FIG. 2D).

The amount of complexity that may be use is variable and it is possible for additional kinds of shapes to be recognized and used. For example, polylines with multiple corners or gaps or combinations thereof may be used. Multiple features may be applied one at a time starting from outer ends and proceeding inward. In this way, the method's application to a single feature can be applied to many features. Patterns of features, such as sets of corners that make a rectangle or other useful shapes, may be recognized. As an editing tool, though, recognizing a single feature and applying it to the geometry is sufficient.

At block 104, the method can use user input to select which geometry curve will be affected by the polyline overdraw. Here, the user selects one or more continuous sections of curve. The selection may be restricted so that the curve does not branch or have multiple disconnected sections that are far apart.

Furthermore, a user may select portions of the geometry to be affected by the overdraw polyline without having specifically selected the objects. To do this, the method determines which geometric curves are closest to the polyline when projected into the user's view. Since the polyline is intended to cause a modification to occur to the existing geometry, the polyline will not be an exact match of the geometry's projection. Instead, it is assumed that the polyline acts as a bridge between the current state of the geometry and the intended state. The outer ends of the polyline will be most similar to the current state of the geometry and the inner region will be the most like the desired modification. Most polyline shapes will have a pair of end points. End points of gaps in polyline shapes may be ignored. Polyline shapes that do not have end points, such as a closed circle, may be ignored. Polyline shapes with three or more end points due to branching may also be ignored.

It is also possible to develop variants that do not ignore closed loops or can make use of polyline shapes with a number of end points greater or less than two. To do this, one might divide the shape into multiple portions and test each portion for proximity to the geometry. For example, one can treat sharp corners in the polyline shape as though they were end points. One could also test the proximity of the interior points of the polyline to the geometry.

The proximity of a polyline end point to the original geometry should be small, to the point of overlapping the original projection completely. When two or more geometry curves are close to the polyline, the method determines which one is used. For example, if both end points of the polyline are close to one geometry curve or two connected geometry curves but only one end point is close to the other, then the curves that match two end points may be selected. Otherwise, the curve may be selected that is a combination of being closest to the end points; plus, the curve should be topmost in the depth of the projection. A weighting of the projected proximity versus depth distance may be performed as a linear combination of the depth distance and the square of the proximity distance. The method allows for other combinations of weighting projection proximity versus depth distance.

If only one of the two polyline end points is close to the geometry, that portion of the geometry is checked to see if it has an end point or a sharp corner near that region. The approximate length of the polyline is used to gauge how close the end or sharp corner needs to be. When there is a nearby end point or sharp corner, the method may use the polyline to redirect or modify that end of the geometry curve.

The region of the geometry that is to be modified is determined to be the portion of the curve that is between the positions that are close to the end points of the polyline. For the case where the end of a geometry curve is specified, the region that is to be modified is the portion of the curve that is close to an end point of the polyline and the end of the curve. The end of the curve may be an end point or a sharp corner.

Referring to block 106, it may be assumed that the direction that the geometry will move during editing should be mostly in the projection plane. However, it may also be assumed that the user will not want the orientation of the original geometry to be altered significantly. The method will choose to move the geometry in a direction that is in plane or perpendicular to the plane of curvature of the geometry at the region being modified.

Each curve in the geometry has associated with it an orientation plane that was assigned to it. The portion of the geometry affected by the overdraw polyline shape will be associated to one of those orientation planes. This is the plane that is used to determine the direction of the geometry modification. The geometry will be shifted in a direction that is either in plane or perpendicular to the associated geometry plane nearest the polyline. If the angle between the normal of the associated plane and the normal of the viewing plane is less than about forty-five degrees, then the geometry may be shifted in plane. If the angle is about forty-five degrees or more, the geometry may be shifted perpendicularly.

The method may restrict the movement of the geometry to the portion that is selected by the overdraw polyline. If the geometric curve is significantly longer than the overdraw polyline, then the method may choose how it will move portions of geometry farther away from the polyline. If the choice of motion is planar to the associated plane of the geometric curve, then the portions of the curve farther away are not moved. The portions of the curve that lead into the part that is moved are shifted less than the full movement as the central portion. The amount of shift may be linear in proportion from the end of the polyline to the central region.

When the shifted movement is in the perpendicular direction, the method will use rotation to shift the portions of the original geometry instead of shifting by a proportional amount. Since the plane of curvature for the geometry is perpendicular to the user's view, that geometry will be foreshortened. The method will follow the geometry curve from the portion that is being directly modified outward along both ends. The method finds positions in the geometry curve where there in an end point, sharp corner, or a change in curvature direction. At the point where the curve changes or ends, the method sets a center point of rotation. The deeper sections of the curve will be rotated to match the position of the curve portion that is shifted perpendicularly. If the curve does not change direction or end, the method will use a linear proportion to reduce the amount of shifting as the curve gets farther away from the portion that is modified by the overdraw polyline. FIG. 3 shows how the plane of curvature in the original geometry 301 is used along with its orientation 302 with respect to the view plane 303 to select a direction to shift the portion of the geometry curve 304. FIG. 3 includes two views of the geometry across a Z-axis.

Referring again to block 106, if the feature or lack of a feature in the polyline shape does not match the features of the corresponding portion of the three-dimensional geometry, then the three-dimensional geometry is modified so that it will have the same characteristics. If the geometry has a sharp corner or gap when the polyline shape is a continuous line, the sharp corner or gap may be removed by joining the ends of the splines in the geometry. If the polyline shape has a sharp corner where the geometry is continuous, a sharp corner may be added by splitting the spline at that portion and shifting the control points at that position so that the angle matches the polyline. If the polyline shape has a gap and the geometry is continuous, then a gap may be added in the geometry by splitting the spline and shifting the end control points to make a gap of the same size. If there are small splines that are smaller than the gap in the area of the gap, the method may remove those splines from the geometry.

If the polyline shape is a double bend, then the method may check to see how many spline control points are in the portion of the affected geometry. If there are at least two inner control points in that portion, then the number of points is sufficient to create a double bend. If there are fewer control points, then the spline may be split at the point nearest the change in direction of the double bend polyline shape.

At block 106, the control points of the affected portion of the original geometry may be moved so that the original geometry is shifted closer to the shape of the overdraw polyline. To determine how close the geometry is to the shape of the polyline, a sampling of the points of the overdraw polyline that will be used for measurement are taken. The shortest distance from each sampled point to the geometry portion as it is projected into the view plane is determined. The sum of the distances can be used as the distance metric to determine how close the geometry is to the polyline.

Referring to FIG. 1B, an iterative approach may be used to move the geometry by small increments. The direction that the control points will be moved has been determined by the orientation of the plane of curvature and the view plane. The direction of geometry movement results in a vector that can be applied to specific control points in the original curve. The method may take into account when the vector follows a rotation for perpendicular movement or the amount of movement is reduced because it is near the end points of the polyline shape.

The control points are moved a small amount in each direction of the vector. The amount of movement can be the equivalent of one screen pixel. For each control point in the affected portion 108, the method calculates the distance metric and notes the difference between the shifted value and the original value of the distance metric when none of the control points are moved 109. The difference for each control point can be used as the proportion and direction for how the control point is moved 110. For a rotational movement, the method can treat the difference as an angle. The method can use a binary search on the distance of the vectors added to the control points to find the value where the distance metric is minimized. It is not necessary for the method to make the distance metric reach zero—the iterative method may end upon meeting a threshold for the distance metric 111.

At block 107 of FIG. 1A, after the geometry is moved, a geometric search process may be used to detect if the new positions of the geometry conform to positions of other geometries in the model. The moved geometry may be compared against a list of symmetries and constraints that take into account both the intrinsic shape of the moved geometry as well as matched equalities between the moved geometry and other geometry in the model.

The constraints may include:

A sharp corner formed by the moved geometry forms a 90 degree angle.

A straight curve in the moved geometry is parallel to another straight curve.

A curve in the moved geometry is concentric with another curve.

A curve in the moved geometry is symmetric to another curve with respect to a common plane.

The moved geometry forms a circular arc.

The moved geometry forms a straight line.

The moved geometry is planar to another curve or surface.

The plane of the moved geometry is perpendicular to another plane or surface.

The plane of the moved geometry is flush to another plane or surface.

An end point of the moved geometry matches the position of another end point.

An end point of the moved geometry matches a point within a curve segment.

An end point of the moved geometry matches a point on a surface or a planar region.

An end point of the moved geometry forms a perpendicular angle with a curve segment.

An end point of the moved geometry is tangent with a curve segment.

The method recognizes these constraints and symmetries as an approximate match. Once identified, the constraint or symmetry may be applied to position the geometry so that it exactly matches the constraint. For example, a moved geometry portion that is nearly circular will be made identically circular. The method may record which constraints and symmetries are applied and use thus data to maintain the constraints when later edits are performed.

If the moved portion of the geometry already had constraints applied to it before the application of the overdraw polyline, the system may re-use those constraints as well as create new constraints. If the movement of the geometry violates a constraint that was originally applied, the method may remove the violated constraints.

The method may make the list of constraints and symmetries applied to the geometry available to the user in a user interface. The user may be allowed to select which constraints or symmetries are valid and which should be ignored. The constraints and symmetries that the user asks the system to ignore are removed from the list of constraints and symmetries and are not applied to the geometry. The method may also make available to the user a set of constraints and symmetries that could be applied to the geometry. For example, if some constraints were not applied because they conflicted with another and the user removes the conflicting constraints, then the method may make available the constraints that were originally not applied. The method may show the user before and after views of what adding or removing a constraint or symmetry will do to the geometry.

It should be noted that the described view plane and the orientation plane of the geometry being modified are used in the modification, with features in the drawing such as corners, gaps, and changes in curvature informing the modification. That is, according to an embodiment of the present disclosure, a method looks for features and can change the topology by adding or removing features.

According to an embodiment of the present disclosure, techniques described herein may be applied to drawing programs that use pen-based input as the means to draw the geometry of the model. The techniques may be applied to drawings that are not created using pen-based input. One can use it to edit the lines of a CAD drawing or other similar geometric model.

It is to be understood that embodiments of the present disclosure may be implemented in various forms of hardware, software, firmware, special purpose processors, or a combination thereof. In one embodiment, a software application program is tangibly embodied on a program storage device or computer program product. The application program may be uploaded to, and executed by, a machine comprising any suitable architecture.

Referring now to FIG. 4, according to an embodiment of the present disclosure, a computer system (block 401) for an overdraw method for editing a three-dimensional geometry includes, inter alia, a central processing unit (CPU) (block 402), a memory (block 403) and an input/output (I/O) interface (block 404). The computer system (block 401) is generally coupled through the I/O interface (block 404) to a display (block 405) and various input devices (block 406) such as a mouse and keyboard. The support circuits can include circuits such as cache, power supplies, clock circuits, and a communications bus. The memory (block 403) can include random access memory (RAM), read only memory (ROM), disk drive, tape drive, etc., or a combination thereof. The present invention can be implemented as a routine (block 407) that is stored in memory (block 403) and executed by the CPU (block 402) to process the signal from the signal source (block 408). As such, the computer system (block 401) is a general purpose computer system that becomes a specific purpose computer system when executing the routine (block 407) of the present disclosure.

The computer platform (block 401) also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the system is programmed. Given the teachings of the present disclosure provided herein, one of ordinary skill in the related art will be able to contemplate these and similar implementations or configurations of the present disclosure.

Having described embodiments for an overdraw method for editing a three-dimensional geometry, it is noted that modifications and variations can be made by persons skilled in the art in light of the above teachings. It is therefore to be understood that changes may be made in embodiments of the present disclosure that are within the scope and spirit thereof.

What is claimed is:

1. A computer program product stored in a non-transitory memory embodying instructions executable by a processor to perform an overdraw method for editing a three-dimensional geometry, the method steps comprising:
   receiving a three-dimensional geometry comprising a plurality of individual curves whose positions are defined by a plurality of control points;
   receiving a polyline overdrawn on the three-dimensional geometry, the polyline drawing representing edits to the three-dimensional drawing;
   analyzing a shape of the received polyline drawing to determine a level of complexity of the shape of the edits to the three-dimensional drawing;
   determining whether the complexity of the shape of the edits to the three-dimensional drawing exceeds a predetermined threshold;
   rejecting the edits to the three-dimensional drawing when it is determined that the complexity of the shape of the edits exceeds the predetermined threshold; and
   when it is determined that the complexity of the shape of the edits does not exceed the predetermined threshold, the three-dimensional geometry is modified according to the edits, the modifying including:
      matching the polyline to the three-dimensional geometry to determine a portion of the three-dimensional geometry being modified;
      recognizing a shape feature of the polyline to determine a shape modification to apply to the three-dimensional geometry;
      shifting the three-dimensional geometry to determine a modified geometry by automatically changing a position of at least one of the control points towards the polyline; and
   matching the modified geometry with at least one symmetry operator to determine whether the changed position satisfies a constraint and applying the constraint to the modified geometry to further modify the modified geometry.

2. The computer program product of claim 1, wherein the polyline has a position placed with respect to a transformed view of the three-dimensional geometry.

3. The computer program product of claim 2, wherein the transformed view is a two-dimensional view.

4. The computer program product of claim 2, wherein each of the plurality of individual curves of the transformed view of the three-dimensional geometry is disposed in a corresponding orientation plane, and further wherein the shifting of the three-dimensional geometry is in the orientation plane or perpendicular to the orientation plane of one of the plurality of individual curves nearest the polyline.

5. The computer program product of claim 4, further comprising selecting between shifting the three-dimensional geometry in the orientation plane or perpendicular to the orientation plane according to an angle formed between the orientation plane and a viewing plane of the transformed view of the three-dimensional geometry.

6. The computer program product of claim 1, further comprising: determining a distance between the three-dimensional geometry and the polyline at each of a sampling of points along the polyline; and summing the distances to determine a distance metric.

7. The computer program product of claim 6, further comprising controlling an iteration of the shifting of the three-dimensional geometry according to a change in the distance metric.

8. The computer program product of claim 1, wherein matching the modified geometry with at least one symmetry operator further comprises:
   determining at least one curve of the modified geometry; and
   matching the curve of the modified geometry to the constraint, wherein the application of the constraint modifies the curve of the modified geometry to match the constraint.

9. The computer program product of claim 8, further comprising adding the constraint to a list associated with the three-dimensional geometry.

10. The computer program product of claim 9, wherein subsequent changes in the position of the three-dimensional geometry are controlled by the list.

11. A computer program embodying instructions executable by a processor to perform an overdraw method for editing a three-dimensional geometry, the method steps comprising:
- receiving a three-dimensional geometry comprising a plurality of individual curves whose positions are defined by a plurality of control points;
- receiving a polyline overdrawn on the three-dimensional geometry, the polyline drawing representing edits to the three-dimensional drawing;
- analyzing a shape of the received polyline drawing to determine a level of complexity of the shape of the edits to the three-dimensional drawing;
- determining whether the complexity of the shape of the edits to the three-dimensional drawing exceeds a predetermined threshold;
- rejecting the edits to the three-dimensional drawing when it is determined that the complexity of the shape of the edits exceeds the predetermined threshold; and
- when it is determined that the complexity of the shape of the edits does not exceed the predetermined threshold, the three-dimensional geometry is modified according to the edits, the modifying including:
- modifying, iteratively, the three-dimensional geometry by shifting the three-dimensional geometry to determine a modified geometry approaching a shape feature of the polyline;
- matching the modified geometry to a constraint; and
- applying the constraint to the modified geometry.

12. The computer program product of claim 11, further comprising:
- determining a distance between the three-dimensional geometry and the polyline at each of a sampling of points along the polyline; and
- summing the distances to determine a distance metric.

13. The computer program product of claim 11, wherein the polyline has a position placed with respect to a transformed view of the three-dimensional geometry.

14. The computer program product of claim 13, wherein the transformed view is a two-dimensional view.

15. The computer program product of claim 13, wherein each of the plurality of individual curves of the transformed view of the three-dimensional geometry is disposed in a corresponding orientation plane, and further wherein the shifting of the three-dimensional geometry is in the orientation plane or perpendicular to the orientation plane of one of the plurality of individual curves nearest the polyline.

16. The computer program product of claim 15, further comprising selecting between shifting the three-dimensional geometry in the orientation plane or perpendicular to the orientation plane according to an angle formed between the orientation plane and a viewing plane of the transformed view of the three-dimensional geometry.

* * * * *